Aug. 31, 1948. E. J. EADDY 2,448,300
LOOM BATTERY FILLING TRUCK
Filed Dec. 15, 1947 2 Sheets-Sheet 1
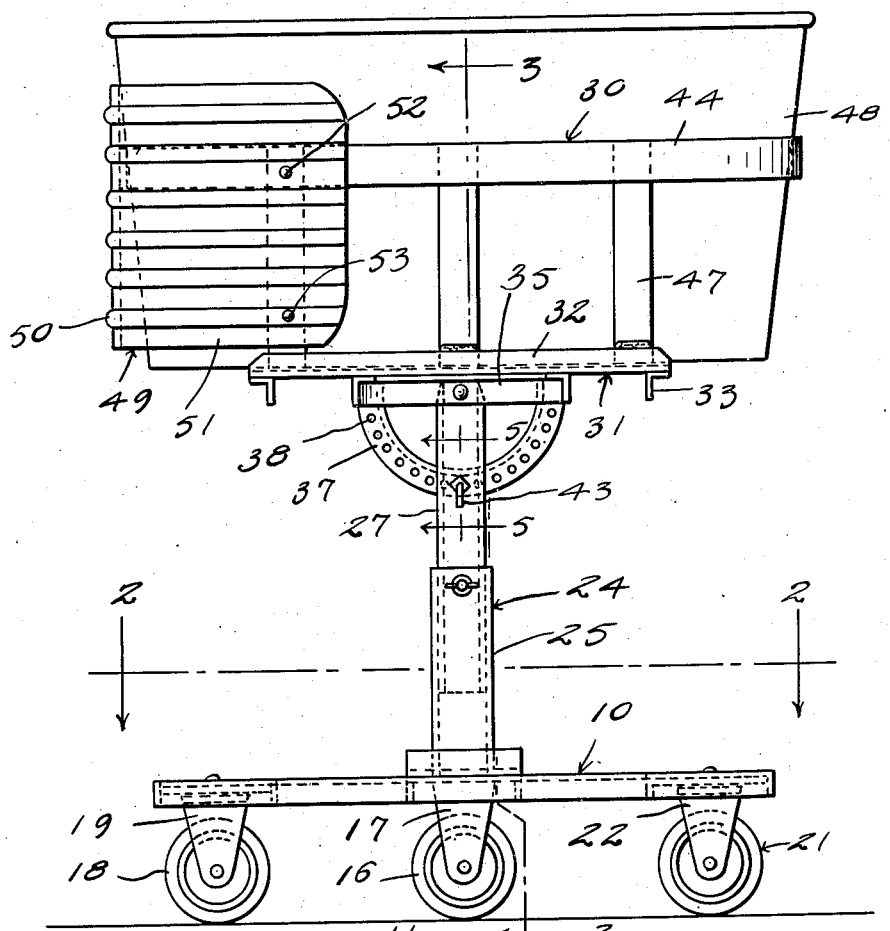
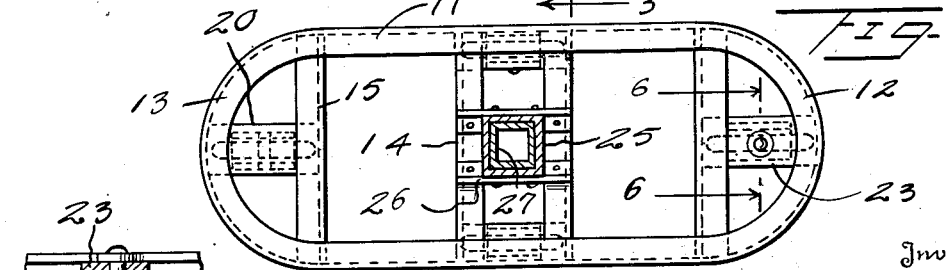
Inventor
Ernest J. Eaddy
By
Kimmel & Crowell Attys.

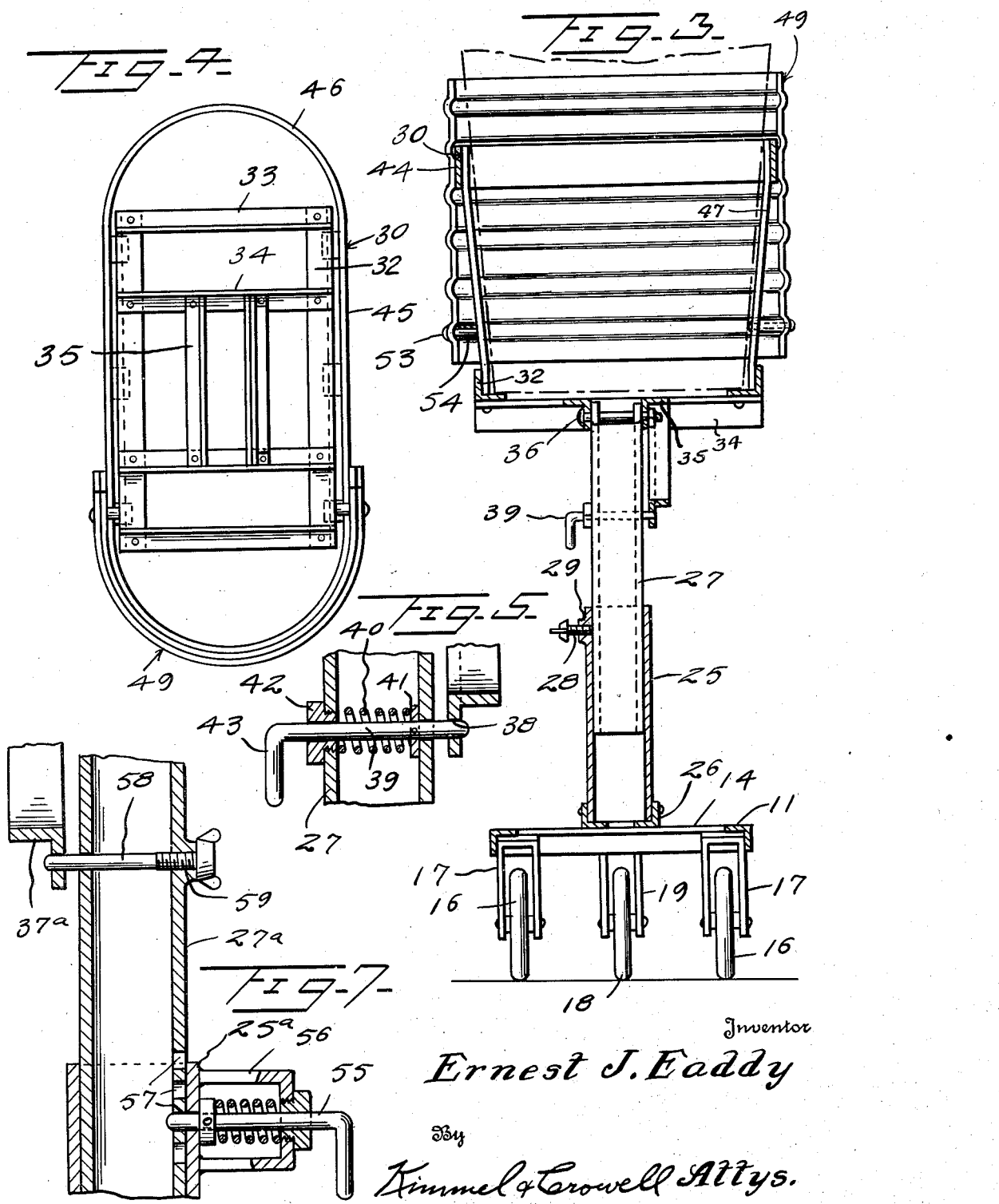

Patented Aug. 31, 1948

2,448,300

UNITED STATES PATENT OFFICE 2,448,300

LOOM BATTERY FILLING TRUCK

Ernest J. Eaddy, Spartanburg, S. C.

Application December 15, 1947, Serial No. 791,767

4 Claims. (Cl. 280—34)

This invention relates to a truck for use in supplying loom batteries with filling.

An object of this invention is to provide a wheeled truck which is designed for carrying the filling used in replenishing the batteries of looms, the truck being constructed so that the height of the basket or carrier may be vertically adjusted in order that the truck may be adjusted to the most convenient height for the person using it.

Another object of this invention is to provide a wheeled truck of this kind which in addition to being vertically adjustable, is also angularly adjustable in order that the basket or carrier may be adjusted to an angle relative to the horizontal which is convenient to the user.

A further object of this invention is to provide a wheeled truck of this kind which also includes a bumper or shield at the forward end thereof so that the container for the filling will not be dented in the event the device strikes the loom or other object.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation of a loom battery filling truck constructed according to an embodiment of this invention.

Figure 2 is a sectional view taken on the line 2—2 of Figure 1.

Figure 3 is a sectional view taken on the line 3—3 of Figure 1.

Figure 4 is a bottom plan view of the receptacle carrier removed from the standard.

Figure 5 is a fragmentary vertical section taken on the line 5—5 of Figure 1.

Figure 6 is a fragmentary sectional view taken on the line 6—6 of Figure 2.

Figure 7 is a fragmentary vertical section of a modified form of carrier and standard adjusting means.

Referring to the drawings, the numeral 10 designates generally a dolly which is constructed in substantially elliptical form and plan and is formed out of angle bar. The dolly 10 is formed of parallel opposite sides 11 and arcuate ends 12 and 13. A pair of intermediate transverse bars 14 are secured between the side bars 11 and outer bars 15 are fixed between the outer ends of the side bars 11 and the junction of the curved ends 12 and 13. The dolly 10 has mounted on the lower side thereof a centrally disposed pair of wheels 16 which are carried by U-shaped brackets 17 which are fixed to the lower side of the dolly 10. A front wheel 18 is rotatably carried by a U-shaped bracket 19 which is fixed to a plate 20 secured between the end member 13 and the adjacent transverse bar 15. A caster wheel 21 which includes a U-shaped bracket or bearing 22 is rotatably secured to a plate 23 which is fixed between the end member 12 and the adjacent transverse bar 15.

A vertically disposed standard or pedestal generally designated as 24 is secured to the central portion of the dolly 10 and includes a lower tubular member 25 which is fixed between a pair of parallel longitudinally extending connecting bars 26 which are secured between the intermediate pair of transverse bars 14. The standard or pedestal 24 also includes an upper adjustable tubular member 27 which is adapted to be secured in selected vertically adjusted position by means of a set screw or wing bolt 28 which is threaded through a boss 29 carried by the upper portion of the lower or fixed tubular member 25.

A carrier or receptacle supporting member generally designated as 30 is carried by the upper tubular member 27 and includes a bottom frame structure 31 which is formed of parallel side angle members 32 connected together adjacent the opposite ends thereof by connecting angle members 33. A pair of intermediate angle members 34 are fixed between the side angle members 32 and a pair of parallel lengthwise extending angle members 35 are fixed between the transverse members 34.

The upper end of the upper member 27 has a pivot bolt 36 extending therethrough and this bolt 36 also extends through the longitudinal angle members 35. A longitudinally curved keeper member 37 is fixed between the transverse members 34 being disposed adjacent one side of the upper member 27 and the keeper bar 37 is formed with a plurality of spaced openings 38. A spring pressed latching bolt 39 is slidably carried by the upper member 27 and is adapted to engage in a selected opening 38 so as to adjust the angular position relative to the horizontal of the carrier 30. The bolt 39 is constantly urged to latching position by means of a spring 40 which at its inner end bears against a washer 41 secured to the bolt 39. The opposite or outer end of the spring 40 bears against a threaded bushing 42 which is threaded through the upper member 27. The bolt 39 at its outer end is formed with a right-angular handle 43 so that this bolt may be readily pulled outwardly to released position and the carrier 30 angularly adjusted.

The carrier 30 also includes an upper substantially elliptical shaped frame bar 44 which is formed of parallel opposite sides 45 and arcuate ends 46. The frame bar 44 is supported above the base 31 by means of a plurality of upwardly extending supporting bars 47 which are fixed between the upper member 44 and the base 31. The carrier 30 is of such size as to removably receive and support a substantially elliptical shaped and tapered filling basket 48 of conventional construction. The forward end of the carrier 30 has secured thereto a U-shaped bumper 49 which is horizontally fluted or corrugated as indicated by the numeral 50 and the parallel sides 51 of the bumper 49 extend rearwardly and are secured by fastening means 52 to the upper member or rim 44. The lower portion of the bumper 49 is fixed to the forward ones of the supporting bars 47 by fastening means 53 and preferably spacer sleeves 54 are disposed about the fastening members 53 so as to firmly support the sides 51 of the bumper in substantially vertical position as clearly shown in Figure 3.

Referring now to Figure 7, there is disclosed a modified form of adjusting means for the carrier. In this modified form the lower standard or pedestal member 25a has slidable therein an upper member 27a. A spring-pressed locking bolt 55 is slidably carried by a U-shaped bracket 56 which is fixed to the upper portion of the lower member 25a and the bolt 55 at its inner end is adapted to engage in a selected one in a series of vertically spaced openings 57 which are formed in the upper member 27a. The arcuate keeper bar 37a which is secured to and depends from the carrier is locked in adjusted position by means of an elongated wing bolt 58 which is threaded through a bushing 59 fixed to the upper member 27a. The inner end of the wing bolt 58 is adapted to engage in a selected one of the openings in the keeper member 37a. It will be obvious from the foregoing that the adjusting means for the standard and for the carrier may be reversed and, if desired, there may be two spring-pressed locking bolts or two threaded wing bolts.

In the use and operation of this device the receptacle 48 is placed in the carrier 30 and the bobbins carrying the yarn are placed in the receptacle 48. The carrier 30 is angularly adjusted to not only the height convenient to the user but the carrier 30 may be angularly adjusted relative to the horizontal so that the user will be able to conveniently remove the bobbins from the receptacle. This truck will provide for substantially universal adjustment for the carrier so that the user will be able to conveniently adjust the device to his or her particular height.

I claim:

1. A truck for supplying loom batteries with filling comprising a mobile base, a receptacle carrier above said base, a pedestal rising from said base, means pivotally securing said carrier to said pedestal, and means locking said carrier in angularly adjusted position on said pedestal, said latter means including an arcuate apertured locking bar dependingly carried by said carrier, and an endwise adjustable locking member carried by said pedestal engageable in a selected opening of said bar.

2. A truck for supplying loom batteries with filling comprising a mobile base, a receptacle carrier above said base, a pedestal rising from said base, means pivotally securing said carrier to said pedestal, and means locking said carrier in angularly adjusted position on said pedestal, said latter means including an arcuate apertured locking bar dependingly carried by said carrier; and an endwise adjustable spring-pressed locking member carried by said pedestal engageable in a selected opening of said bar.

3. A truck for supplying loom batteries with filling comprising a mobile base, a receptacle carrier above said base, a pedestal rising from said base, means pivotally securing said carrier to said pedestal, and means locking said carrier in angularly adjusted position on said pedestal, said latter means including an arcuate apertured locking bar dependingly carried by said carrier, and an endwise adjustable threaded locking member carried by said pedestal engageable in a selected opening of said bar.

4. A truck for supplying loom batteries with filling comprising a mobile base, a receptacle carrier above said base, a pedestal rising from said base, means pivotally securing said carrier to said pedestal, means locking said carrier in angularly adjusted position on said pedestal, and a bumper carried by one end of said carrier, said bumper being of U-shape in horizontal section and substantially encompassing said one end of said carrier.

ERNEST J. EADDY.

REFERENCES CITED

The following references are of record in the file of this patent:

UNITED STATES PATENTS

| Number | Name | Date |
| --- | --- | --- |
| 1,530,014 | Sarff | Mar. 14, 1925 |